United States Patent
Dziecielski et al.

(10) Patent No.: US 11,636,445 B2
(45) Date of Patent: Apr. 25, 2023

(54) AIRCRAFT DE-ICING DETERMINATION SYSTEMS AND METHODS

(71) Applicant: THE BOEING COMPANY, Chicago, IL (US)

(72) Inventors: Jakub Dziecielski, Gdansk (PL); Piotr Marian Mazuz, Gdansk (PL); Jonasz Rudnik, Gdansk (PL); Michal Ruminski, Gdansk (PL); Aleksander Rydzewski, Gdansk (PL); Jason W. Clark, Evergreen, CO (US)

(73) Assignee: THE BOEING COMPANY, Chicago, IL (US)

( * ) Notice: Subject to any disclaimer, the term of this patent is extended or adjusted under 35 U.S.C. 154(b) by 84 days.

(21) Appl. No.: 16/686,265

(22) Filed: Nov. 18, 2019

(65) Prior Publication Data
US 2021/0150488 A1    May 20, 2021

(51) Int. Cl.
| | | |
|---|---|---|
| *G06Q 10/10* | (2012.01) | |
| *G06Q 10/1093* | (2023.01) | |
| *G07C 5/00* | (2006.01) | |
| *B64F 5/20* | (2017.01) | |

(52) U.S. Cl.
CPC ......... *G06Q 10/1097* (2013.01); *G07C 5/008* (2013.01); *B64F 5/20* (2017.01)

(58) Field of Classification Search
None
See application file for complete search history.

(56) References Cited

U.S. PATENT DOCUMENTS

| | | | | |
|---|---|---|---|---|
| 6,384,611 | B1 * | 5/2002 | Wallace | B64D 15/20 324/699 |
| 6,820,841 | B2 * | 11/2004 | Mittereder | B64F 5/20 244/134 C |
| 10,490,086 | B1 * | 11/2019 | Baker | G08G 5/0013 |
| 10,663,597 | B1 * | 5/2020 | Dormiani | G08G 5/0008 |
| 2005/0082435 | A1 * | 4/2005 | Rasmussen | B64F 5/20 244/134 C |
| 2007/0040064 | A1 * | 2/2007 | Lee | B64F 5/20 244/134 R |
| 2009/0125167 | A1 * | 5/2009 | Ma | B64D 15/20 340/963 |
| 2010/0005688 | A1 * | 1/2010 | Lins | E01H 5/00 37/197 |

(Continued)

FOREIGN PATENT DOCUMENTS

WO    WO-0192106 A2 * 12/2001    ........... B64F 5/27

OTHER PUBLICATIONS

ADS-B, Wikipedia, archives org, Dec. 1, 2020 (Year: 2020) https://web.archive.org/web/20201201211656/https://en.wikipedia.org/wiki/Automatic_Dependent_Surveillance%E2%80%93Broadcast.*

(Continued)

*Primary Examiner* — Octavian Rotaru
(74) *Attorney, Agent, or Firm* — The Small Patent Law Group LLC; Joseph M. Butscher

(57) ABSTRACT

A system and a method include at least one control unit that determines a de-icing time for an aircraft within a de-icing area of an airport, predicts a de-icing time for an aircraft within a de-icing area of an airport, schedules de-icing times for a plurality of aircraft within a de-icing area of an airport, and/or predicts demand for future de-icing operations of aircraft within a de-icing area of an airport.

21 Claims, 5 Drawing Sheets

(56) References Cited

U.S. PATENT DOCUMENTS

| | | | | |
|---|---|---|---|---|
| 2010/0090891 | A1* | 4/2010 | Donovan | G08G 5/06 |
| | | | | 342/357.41 |
| 2012/0262339 | A1* | 10/2012 | Garcia | G01S 5/10 |
| | | | | 342/387 |
| 2015/0014478 | A1* | 1/2015 | Lassen | B64C 3/56 |
| | | | | 244/49 |
| 2015/0081141 | A1* | 3/2015 | Campbell | B64F 5/20 |
| | | | | 701/3 |
| 2015/0298826 | A1* | 10/2015 | Luca | B64D 15/10 |
| | | | | 244/134 R |
| 2016/0075436 | A1* | 3/2016 | Rossano | G06F 3/04847 |
| | | | | 715/771 |
| 2016/0075443 | A1* | 3/2016 | Schmutz | G08G 5/0021 |
| | | | | 701/14 |
| 2016/0269274 | A1* | 9/2016 | Anandappan | H04B 7/185 |
| 2020/0312164 | A1* | 10/2020 | Bazawada | G06F 3/0484 |
| 2020/0334994 | A1* | 10/2020 | Jensen | G08G 5/0091 |

OTHER PUBLICATIONS

Lee et al, Deicing decision support tool, 23rd Digital Avionics Conf IEEE Cat No. 04CH37576, 2004 https://ieeexplore.ieee.org/abstract/document/1391283 (Year: 2004).*

ADS-B, Wikipedia, archives org, Dec. 1, 2020 https://web.archive.org/web/20201201211656/https://en.wikipedia.org/wiki/Automatic_Dependent_Surveillance%E2%80%93Broadcast (Year: 2020).*

* cited by examiner

AIRCRAFT DE-ICING DETERMINATION SYSTEMS AND METHODS

FIELD OF THE DISCLOSURE

Embodiments of the subject disclosure generally relate to systems and methods for determining a de-icing time for an aircraft at an airport, predicting a de-icing time for aircraft, and scheduling de-icing of aircraft at the airport.

BACKGROUND OF THE DISCLOSURE

Aircraft are used to transport passengers and cargo between various locations. Numerous aircraft depart from and arrive at a typical airport every day.

During periods of inclement weather, such as cold weather, aircraft undergo deicing operations before taking off. A de-icing process removes ice, snow, or frost from an aircraft. De-icing is reactive, and is used remove ice, snow, or frost that is already on an aircraft. In contrast, anti-icing is proactive, and is used to prevent such precipitation from accumulating on an aircraft. Both de-icing and anti-icing are performed at de-icing areas, such as de-icing pads. In some instances, de-icing is performed before anti-icing. Typically, an airport includes one or more de-icing areas where de-icing operations (including de-icing and/or anti-icing) occur. An aircraft can be de-iced while parked by a gate, and/or taxi to a de-icing area to be de-iced.

Typically, an aircraft operator contacts de-icing personnel to request a de-icing operation. The de-icing personnel assigns and schedules the particular aircraft to a particular de-icing area. After the de-icing operation is completed, the aircraft operator reports to ground control personnel that the aircraft is ready to taxi to a runway. In general, communication between the aircraft operator, the de-icing personnel, and the ground control personnel occurs through telephones, radio devices, or the like. For example, the aircraft operator speaks to the de-icing personnel and the ground control personnel through radio devices.

A time of de-icing can be assessed by an individual, but typically is not recorded. If a time of de-icing is reported, such time is manually determined, and, as such, may be prone to human error. Often, while aircraft are queued for de-icing operations, wait times for the de-icing operations can be longer than expected due to inaccurate assumptions regarding current and prior de-icing operations. For example, an aircraft operator may be informed by de-icing personnel to taxi to a de-icing area, only to find a long line of aircraft waiting to be de-iced. In general, de-icing personnel plan de-icing operations for aircraft based on requests from aircraft operators, which can lead to unnecessary wait times for de-icing.

SUMMARY OF THE DISCLOSURE

A need exists for a system and method for accurately and effectively determining de-icing operations for aircraft. Further, a need exists for a system and method for effectively scheduling de-icing operations at an airport.

With those needs in mind, certain embodiments of the subject disclosure provide a system including at least one control unit that determines a de-icing time for an aircraft within a de-icing area of an airport. As an example, the at least one control unit includes a de-icing time analysis control unit.

In at least one embodiment, the system also includes a tracking sub-system in communication with the at least one control unit. The tracking sub-system tracks a position of the aircraft at the airport. The at least one control unit determines the de-icing time for the aircraft based on the position of the aircraft in relation to the de-icing area. In at least one embodiment, the tracking sub-system is an automatic dependent surveillance-broadcast (ADS-B) tracking sub-system.

In at least one embodiment, the system also includes an airport mapping sub-system in communication with the at least one control unit. The at least one control unit receives airport map data including a location of the de-icing area from the airport mapping sub-system.

As an example, the at least one control unit determines the de-icing time by comparing an entry time of the aircraft into the de-icing location and an exit time of the aircraft from the de-icing location.

In at least one embodiment, the system also includes a weather determination sub-system in communication with the at least one control unit. The weather determination sub-system provides weather data indicative of current weather conditions in relation to the airport. The at least one control unit associates weather conditions with the de-icing time.

In at least one embodiment, the system also includes a historic de-icing datastore in communication with the at least one control unit. The at least one control unit stores de-icing data including the de-icing time for the aircraft within the at historic de-icing datastore. In at least one embodiment, the de-icing data also includes weather data including weather conditions during the de-icing time, and/or aircraft data including aircraft type of the aircraft.

In at least one embodiment, the at least one control unit further predicts a de-icing time for at least one other aircraft within the de-icing area of the airport. As an example, the at least one control unit includes a de-icing prediction control unit.

In at least one embodiment, the historic de-icing datastore stores historic de-icing data comprising de-icing times for a plurality of aircraft over a predetermined time period. The at least one control unit predicts the de-icing time for the at least one other aircraft based on the historic de-icing data. In at least one embodiment, the historic de-icing data also includes weather data including weather conditions during the de-icing times, and/or aircraft data including aircraft type of the plurality of aircraft.

In at least one embodiment, the at least one control unit schedules de-icing times based on the predicted de-icing times for the at least one other aircraft.

In at least one embodiment, the at least one control unit further predicts demand for future de-icing operations based on historic de-icing data.

Certain embodiments of the subject disclosure provide a method including determining, by at least one control unit, a de-icing time for an aircraft within a de-icing area of an airport.

In at least one embodiment, the method also includes tracking, by a tracking sub-system in communication with the at least one control unit, a position of the aircraft at the airport, and determining, by the at least one control unit, the de-icing time for the aircraft based on the position of the aircraft in relation to the de-icing area.

In at least one embodiment, the method also includes receiving, by the at least one control unit from an airport mapping sub-system in communication with the at least one control unit, airport map data including a location of the de-icing area from the airport mapping sub-system.

As an example, said determining the de-icing time comprises comparing an entry time of the aircraft into the de-icing location and an exit time of the aircraft from the de-icing location.

In at least one embodiment, the method also includes receiving, by the at least one control unit from a weather determination sub-system in communication with the at least one control unit, weather data indicative of current weather conditions in relation to the airport, and associating, by the at least one control unit, weather conditions with the de-icing time.

In at least one embodiment, the method also includes storing, within a historic de-icing datastore in communication with the at least one control unit, de-icing data including the de-icing time for the aircraft.

In at least one embodiment, the method also includes predicting, by the at least one control unit, a de-icing time for at least one other aircraft within the de-icing area of the airport.

In at least one embodiment, the method also includes storing, within a historic de-icing datastore in communication with the at least one control unit, historic de-icing data comprising de-icing times for a plurality of aircraft over a predetermined time period. Said predicting includes predicting the de-icing time for the at least one other aircraft based on the historic de-icing data.

In at least one embodiment, the method also includes scheduling, by the at least one control unit, de-icing times based on the predicted de-icing times for the at least one other aircraft.

In at least one embodiment, the method also includes predicting, by the at least one control unit, demand for future de-icing operations based on historic de-icing data.

Certain embodiments of the subject disclosure provide a system including at least one control unit that predicts a de-icing time for an aircraft within a de-icing area of an airport.

Certain embodiments of the subject disclosure provide a method including predicting, by at least one control unit, a de-icing time for an aircraft within a de-icing area of an airport.

Certain embodiments of the subject disclosure provide a system including at least one control unit that schedules de-icing times for a plurality of aircraft within a de-icing area of an airport.

Certain embodiments of the subject disclosure provide a method including scheduling, by at least one control unit, de-icing times for a plurality of aircraft within a de-icing area of an airport.

Certain embodiments of the subject disclosure provide a system including at least one control unit that predicts demand for future de-icing operations of aircraft within a de-icing area of an airport.

Certain embodiments of the subject disclosure provide a method including predicting, by at least one control unit, demand for future de-icing operations of aircraft within a de-icing area of an airport.

Certain embodiments of the present disclosure provide a system that includes at least one first control unit that determines, based on tracked aircraft position data, a de-icing time for a first aircraft within a de-icing area of an airport, and at least one second control unit that determines, based on the de-icing time, a schedule for de-icing one or both of the first aircraft and a second aircraft.

Certain embodiments of the present disclosure provide a method including determining, by at least one first control unit, a de-icing time for a first aircraft within a de-icing area of an airport based on tracked aircraft position data, and determining, by at least one second control unit, a schedule for de-icing one or both of the first aircraft or a second aircraft based on the de-icing time.

Certain embodiments of the present disclosure provide a non-transitory computer-readable storage medium comprising executable instructions that, in response to execution, cause one or more control units comprising a processor, to perform operations as described herein.

DETAILED DESCRIPTION OF THE DISCLOSURE

Figures 1, 2:
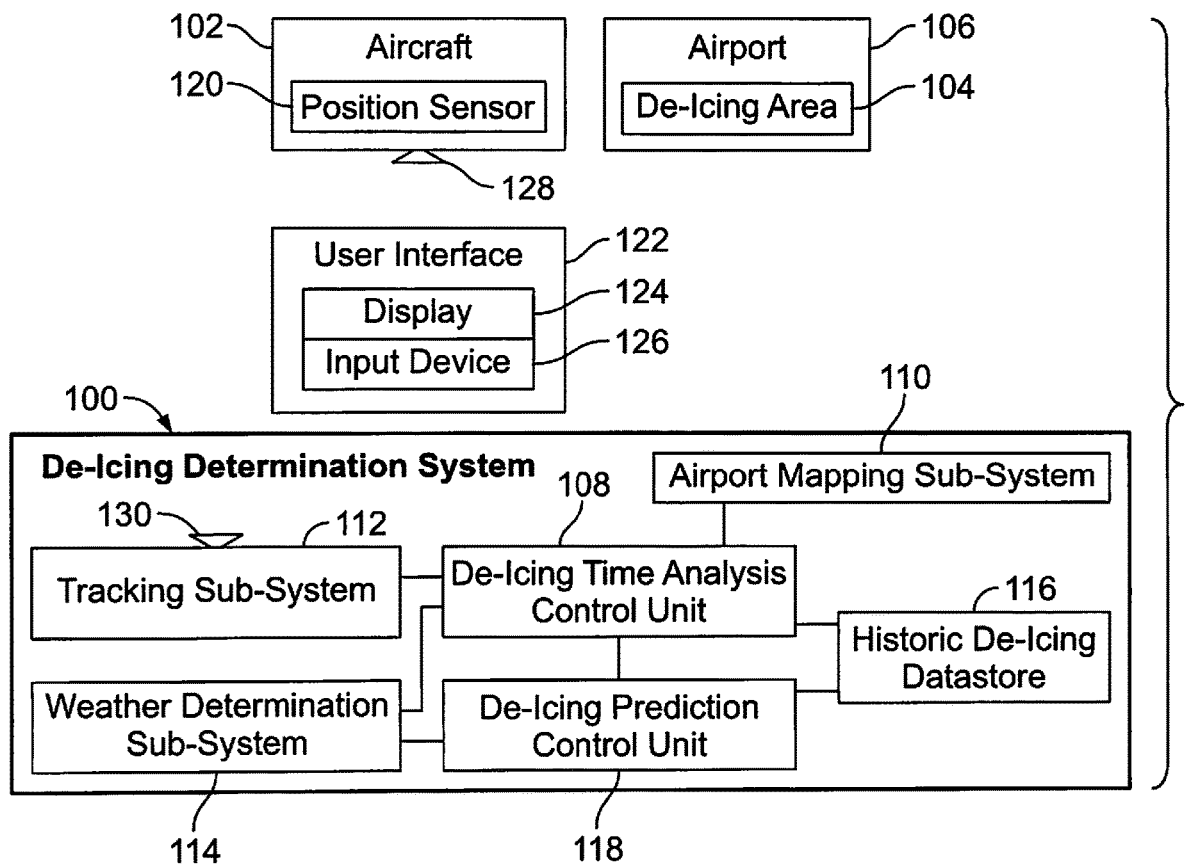
FIG. 1 illustrates a schematic block diagram of a de-icing determination system for analyzing de-icing operations of an aircraft, according to an embodiment of the subject disclosure.
FIG. 2 illustrates a front view of a display showing a de-icing schedule, according to an embodiment of the subject disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition can include additional elements not having that condition.

Certain embodiments of the subject disclosure provide systems and methods that measure de-icing duration based on aircraft positional and geospatial airport mapping data. In at least one embodiment, the systems and methods provide predictive recommendations for future increased need for de-icing. Embodiments of the subject disclosure address needs at airports that encounter frequent or severe winter conditions. Embodiments of the subject disclosure solve the problem of inefficient manual processes to identify, assign, and plan for de-icing of aircraft. Further, embodiments of the subject disclosure provide valuable information to ground control and air traffic control to monitor and plan for de-icing.

Certain embodiments of the subject disclosure provide a system and a method for assigning and monitoring aircraft ground de-icing operations, based on a combination of aircraft positional data and geospatial airport data. In at least one embodiment, the systems and methods also analyze historical de-icing data and predict the need for de-icing operations.

Embodiments of the subject disclosure automatically track occupancy of de-icing pads and measure times needed to perform de-icing and anti-icing in current weather conditions. Further, analysis of historical de-icing records allows for predictions of future demand on de-icing services. The systems and methods of the subject disclosure support efficient use of de-icing areas, and provide real-time information about on-going de-icing operations. Automatic detection of occupancy of de-icing areas improves efficiency of de-icing operations by reducing communication between individuals, such as aircraft operators, de-icing personnel, and ground control personnel. Further, analysis of historical de-icing data allows performance of current de-icing operations to be tracked to determine delays.

As described herein, certain embodiments of the subject disclosure provide a system that includes at least one control unit that determines a de-icing time for an aircraft within a de-icing area of an airport. That is, the control unit(s) detects the time for a de-icing operation that is occurring or has occurred. The determination is automatic (for example, occurs without human intervention). Certain embodiments of the subject disclosure provide a method that includes determining, by at least one control unit, a de-icing time for an aircraft within a de-icing area of an airport.

Certain embodiments of the subject disclosure provide a system including at least one control unit that predicts a de-icing time for an aircraft within a de-icing area of an airport. That is, the control unit(s) predicts a time for de-icing that has not yet started. The prediction is automatic (for example, occurs without human intervention). Certain embodiments of the subject disclosure provide a method that includes predicting, by at least one control unit, a de-icing time for an aircraft within a de-icing area of an airport.

Certain embodiments of the subject disclosure provide a system including at least one control unit that schedules de-icing times for a plurality of aircraft within a de-icing area of an airport. The scheduling is automatic (for example, occurs without human intervention). Certain embodiments of the subject disclosure provide a method that includes scheduling, by at least one control unit, de-icing times for a plurality of aircraft within a de-icing area of an airport.

Certain embodiments of the subject disclosure provide a system including at least one control unit that predicts demand for future de-icing operations of aircraft within a de-icing area of an airport. The predicting is automatic (for example, occurs without human intervention). Certain embodiments of the subject disclosure provide a method that includes predicting, by at least one control unit, de-icing times for a plurality of aircraft within a de-icing area of an airport.

Certain embodiments of the subject disclosure provide a system and a method include at least one control unit that determines a de-icing time for an aircraft within a de-icing area of an airport, predicts a de-icing time for an aircraft within a de-icing area of an airport, schedules de-icing times for a plurality of aircraft within a de-icing area of an airport, and predicts demand for future de-icing operations of aircraft within a de-icing area of an airport.

FIG. 1 illustrates a schematic block diagram of a de-icing determination system 100 for analyzing de-icing operations of an aircraft 102, according to an embodiment of the subject disclosure. The aircraft 102 is de-iced (that is, undergoes de-icing operations) at a de-icing area 104 of an airport 106.

The de-icing determination system 100 includes one or more control units. In at least one embodiment, the de-icing determination system 100 includes a de-icing time analysis control unit 108 in communication with an airport mapping sub-system 110, a tracking sub-system 112, a weather determination sub-system 114, and a historic de-icing datastore 116, such as through one or more wired or wireless connections. A de-icing prediction control unit 118 is also in communication with the weather determination sub-system 114 and the historic de-icing datastore 116, such as through one or more wired or wireless connections. As shown, the de-icing time analysis control unit 108 and the de-icing prediction control unit 118 are separate and distinct control units. Optionally, the de-icing time analysis control unit 108 and the de-icing prediction control unit 118 are part of a common control unit.

The de-icing time analysis control unit 108 and the de-icing prediction control unit 118 can be located at a common location. Further, each of the de-icing time analysis control unit 108, the de-icing prediction control unit 118, the tracking sub-system 112, the weather determination sub-system 114, the airport mapping sub-system 110, and the historic de-icing datastore 116 can be remotely located from one another, or located at a common location (or a first subset can be commonly located, while a second subset, whether commonly located or not, can be remotely located from the first subset).

A user interface 122 includes a display 124 and an input device 126, both of which can be in communication with an operational control unit. The display 124 can be a monitor, screen, television, touchscreen, and/or the like. The input device 126 can include a keyboard, mouse, stylus, touchscreen interface (that is, the input device 126 can be integral with the display 124), and/or the like.

In at least one embodiment, the aircraft 102 includes the user interface 122. For example, the user interface 122 can be in communication with and/or form a part of a flight computer of the aircraft 102. As another example, the user interface 122 can be part of a separate computer workstation aboard the aircraft 102. As another example, the user interface 122 can be a handheld device, such as a smart phone, table, or the like, within the aircraft 102. Optionally, the user interface 122 can be located remotely from the aircraft 102, such as at an air traffic control location, a ground control location, the de-icing area 104, and/or the like. In at least one embodiment, the aircraft 102, the de-icing area 104, the air traffic control location, and the ground control location include a user interface 122.

The de-icing time analysis control unit 108 and the de-icing prediction control unit 118 can be in communication with the user interface 122 through one or more wired (if at the same location), or wireless connections. For example, the de-icing time analysis control unit 108, the de-icing prediction control unit 118, and the user interface 122 can include communication devices, such as antennas, transceivers, and/or the like, which allow for wireless communication therebetween. As another example, the de-icing time analysis control unit 108, the de-icing prediction control unit 118, and the user interface 122 can be in communication through an intermediate medium, such as through the Internet, a private communication network, and/or the like.

The aircraft 102 includes a position sensor 120 and is configured to be tracked by the tracking sub-system 112. The position sensor 120 can be a global positioning system sensor, an automatic dependent surveillance-broadcast (ADS-B) communication device (such as for collecting and sending data from GPS and other aircraft systems), and/or the like. The position sensor 120 outputs a signal indicative of one or more of the position, altitude, heading, acceleration, velocity, and/or the like of the aircraft 102. The aircraft 102 also includes a communication device 128, such as a transceiver, radio unit, and/or the like, that allows the aircraft 102 to wirelessly communicate with a similar communication device 130 of the tracking sub-system 112.

The tracking sub-system 112 is configured to track a current position of the aircraft 102. In at least one embodiment, the tracking sub-system 112 is an ADS-B tracking sub-system. In such an embodiment, the ADS-B tracking sub-system 112 determines a current position of the aircraft 102 via satellite navigation through a positional signal of the aircraft 102 output by the position sensor 120. The position sensor 120 can be or include a transmitter that periodically outputs information about the aircraft 102, such as identification details, current position, current altitude, and current velocity. The tracking sub-system 112 receives the transmitted position signal from the position sensor 120 to determine a current and real time position, heading, velocity, and the like of the aircraft 102. Alternatively, the tracking sub-system 112 can be a radar system or other such system that is configured to track the position of the aircraft 102.

The airport mapping sub-system 110 maps a layout of the airport 106. For example, the airport mapping sub-system 110 provides airport map data regarding the various areas of the airport 106, such as the de-icing area 104. In at least one embodiment, the airport mapping sub-system 110 locates areas of the airport 106, such as the de-icing area 104, through global position system (GPS) data. In at least one other embodiment, the airport mapping sub-system 110 locates areas of the airport 106 through various sensors and features that are registered or otherwise associated with the various areas of the airport 106.

The weather determination sub-system 114 communicates the current weather at and proximate to the airport 106 to the de-icing time analysis control unit 108 and/or the de-icing prediction control unit 118. For example, the weather determination sub-system 114 can be a meteorological and weather service that is in communication with the de-icing time analysis control unit 108 and/or the de-icing prediction control unit 118. In at least one other embodiment, the weather determination sub-system 114 can be an independent weather determination and forecasting system and/or service. For example, the weather determination sub-system 114 can include one or more Doppler radar installations.

In operation, the aircraft 102 is tracked by the tracking sub-system 112. The de-icing time analysis control unit 108 receives position data indicative of the current position of the aircraft 102 from the tracking sub-system 112. The de-icing time analysis control unit 108 determines the position of the aircraft 102 in relation to a location of the airport 106 by correlating the position data with airport map data received from the airport mapping sub-system 110. As such, the de-icing time analysis control unit 108 determines a current position of the aircraft 102 at the airport 106.

As the aircraft 102 enters the de-icing area 104, the de-icing time analysis control unit 108 detects the position of the aircraft 102 at the de-icing area 104, such as through analysis of the position data of the aircraft 102 received from the tracking sub-system 112 correlated with the airport map data received from the airport mapping sub-system 110. The de-icing time analysis control unit 108 records an entry time of the aircraft 104 as the aircraft 102 enters the de-icing area 104. The aircraft 102 undergoes de-icing operations within the de-icing area 104. As the aircraft 102 exits the de-icing area 104, the de-icing time analysis control unit 108 records an exit time of the aircraft 102 from the de-icing area 104. The de-icing time analysis control unit 108 then compares the entry time and the exit time to determine a time of de-icing of the aircraft 102. In at least one embodiment, the de-icing time analysis control unit 108 includes or is otherwise coupled to a timer that is active and tracks a total time from the entry time to the exit time. In at least one other embodiment, the de-icing time analysis control unit 108 merely records the entry time and the exit time, and compares the times to determine the total time of deicing (such as by subtracting the entry time from the exit time).

The de-icing time analysis control unit 108 also receives weather data from the weather determination sub-system 114. The weather data provides current weather conditions, such as temperature, wind speed and direction precipitation, and the like in relation to (such as at and/or proximate to) the airport 106. The de-icing time analysis control unit 108 associates (for example, couples, correlates, records, or the like) the weather conditions, as included in the weather data received from the weather determination sub-system 114, for the time of de-icing of the aircraft 102.

The de-icing time analysis control unit 108 stores de-icing data, including the time of de-icing, for the aircraft 102 in the historic de-icing datastore 116. The de-icing data includes the time of de-icing. In at least one embodiment, the de-icing data also weather data including the weather conditions during the time of de-icing. In at least one embodiment, the de-icing data also includes aircraft data, such as aircraft type and size, for the aircraft 102 that has been de-iced.

As described, the de-icing time analysis control unit 108 automatically determines a time of de-icing of the aircraft 102. The de-icing data can be output to the user interface 122 and shown on the display 124, for example. In this manner, additional aircraft 102 can be notified of de-icing times of aircraft 102 that have already undergone de-icing operations, thereby allowing aircraft operators to assess future times of de-icing operations. Accordingly, personnel are able to estimate upcoming times of upcoming de-icing operations for other aircraft 102 during a particular day, which allows for effective scheduling of the de-icing operations for various aircraft at the airport 106.

In at least one embodiment, the de-icing data, including time of de-icing, aircraft data, and weather data, is stored in the historic de-icing datastore 116 as historic de-icing data for a plurality of aircraft 102 at the airport 106 over a predetermined period of time. The de-icing data can be stored for a week, a month, a year, multiple years, or the like.

The de-icing prediction control unit 118 analyzes the de-icing data stored in the historic de-icing datastore 116 in relation to requests for de-icing at the airport 106. For example, numerous aircraft 102 are to undergo de-icing operations during a particular day. The de-icing prediction control unit 118 receives weather data from the weather determination sub-system 114 to determine current weather conditions in relation to the airport 106. The de-icing prediction control unit 118 then receives aircraft data for the aircraft 102 that are to undergo de-icing operations at the de-icing area 104. The de-icing prediction control unit 118 then analyzes the historic de-icing data stored in the historic de-icing datastore 116 to find similar weather conditions for similar aircraft. For example, the de-icing prediction control unit 118 finds de-icing data for an aircraft that is the same as a particular aircraft 102 to be de-iced during similar weather conditions. The de-icing prediction control unit 118 performs such operation for each of the aircraft 102 that are to be de-iced. The de-icing prediction control unit 118 then determines the de-icing times for aircraft that have previously undergone de-icing operations during similar weather conditions, such as through the historic de-icing data, to predict a time of de-icing for the aircraft 102 at current weather conditions in relation to the airport 106. In at least one embodiment, the de-icing prediction control unit 118 uses a closest match for the aircraft 102 at current weather conditions to determine a predicted time of de-icing. In at least one other embodiment, the de-icing prediction control unit 118 analyzes historic de-icing data for similar aircraft types during similar weather conditions (for example, within a predetermined temperature, wind speed, and precipitation threshold) to determine an average of a plurality of similar de-icing times and thereby determine the prediction time of de-icing. In this manner, the de-icing prediction control unit 118 predicts a time of de-icing for each aircraft 102 to be de-iced. Further, in at least one embodiment, the de-icing prediction control unit 118 then forms a schedule for various aircraft 102 to be de-iced at the de-icing area 104.

FIG. 2 illustrates a front view of the display 124 showing a de-icing schedule 200, according to an embodiment of the subject disclosure. Referring to FIGS. 1 and 2, the de-icing schedule 200 lists an identity 222 of the aircraft 102 at the airport 106 that are to undergo de-icing operations, a type 224 of each aircraft 102, a predicted time of de-icing 226 (as determined by the de-icing prediction control unit 118 through analysis of the historic de-icing data stored in the historic de-icing datastore 116), and scheduled de-icing time 228 for each of the aircraft 102 (as determined by the de-icing prediction control unit 118). In at least one embodiment, the scheduled de-icing time 228 can be generated and/or improved based on other or additional parameters, such as flight schedules, current locations of the aircraft 102 at the airport, and the like. Optionally, the de-icing schedule 200 does not show the aircraft type 224 and/or the predicted time of de-icing 226.

In at least one embodiment, an operator of an aircraft 102 requests a de-icing operation for the aircraft 102, which is then scheduled, as described herein. As another example, airport personnel request de-icing operations for aircraft 102, which are then scheduled. As another example, aircraft 102 that are scheduled for takeoff from the airport are automatically scheduled for de-icing operations, as described herein. The scheduled times for de-icing are output to the aircraft 102.

In at least one embodiment, the de-icing time analysis control unit 108 also analyzes de-icing times in relation to the historic de-icing data stored in the historic de-icing datastore to provide a quality review of de-icing operations. For example, the de-icing time analysis control unit 108 determines a de-icing time for an aircraft 102, as described herein, and compares the de-icing time with previous de-icing times for similar aircraft during similar weather conditions. If the de-icing time for the aircraft 102 exceeds a predetermined threshold (such as more than 5%, for example) in relation to previous de-icing times, the de-icing time analysis control unit 108 generates a quality alert, which can be output to the user interface 122.

Figure 3:
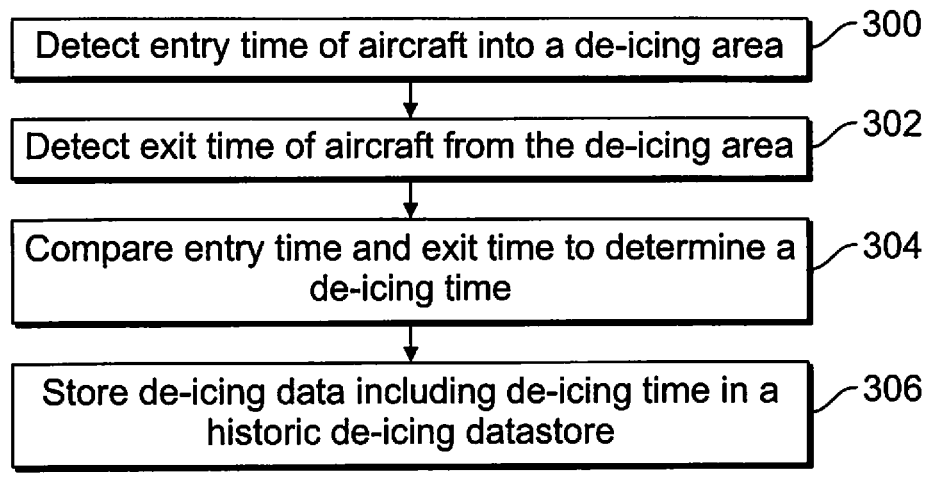
FIG. 3 illustrates a flow chart of a method of determining a de-icing time for an aircraft, according to an embodiment of the subject disclosure.

FIG. 3 illustrates a flow chart of a method of determining a de-icing time for an aircraft, according to an embodiment of the subject disclosure. Referring to FIGS. 1 and 3, at 300, the de-icing time analysis control unit 108 detects an entry time of the aircraft 102 into the de-icing area 104 of the airport 106. At 302, the de-icing time analysis control unit 108 detects an exit time of the aircraft 102 from the de-icing area 302. At 304, the de-icing time analysis control unit 108 compares the entry time and the exit time to determine a de-icing time for the aircraft 102. At 306, the de-icing time analysis control unit 108 stores de-icing data including de-icing time (and, in at least one embodiment, the aircraft type and weather conditions) in the historic de-icing datastore 116.

Figure 4A:
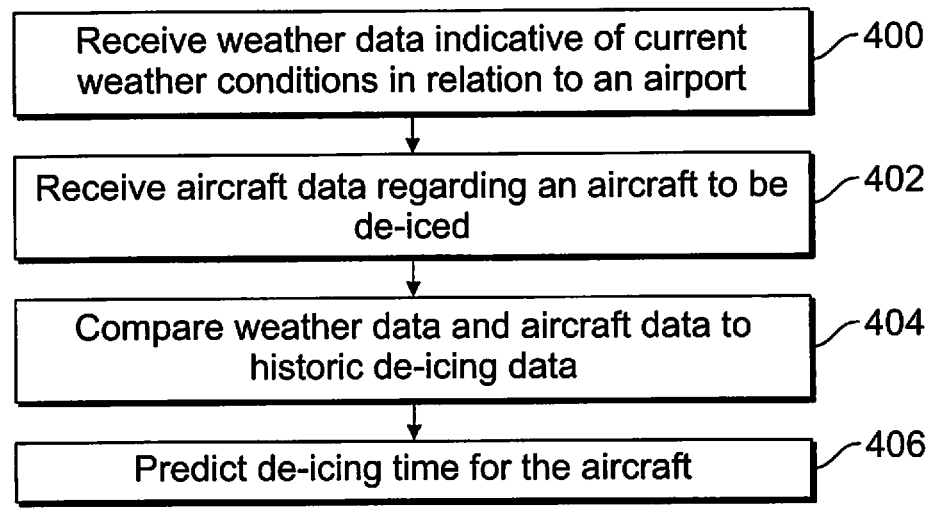
FIG. 4A illustrates a flow chart of a method of predicting a de-icing time for an aircraft, according to an embodiment of the subject disclosure.

FIG. 4A illustrates a flow chart of a method of predicting a de-icing time for an aircraft, according to an embodiment of the subject disclosure. Referring to FIGS. 1 and 4A, at 400, the de-icing prediction control unit 118 receives weather data indicative of current weather conditions in relation to the airport 106. At 402, the de-icing prediction control unit 118 receives aircraft data regarding an aircraft 102 to be de-iced. Steps 400 and 402 can occur in any order, or concurrently.

At 404, the de-icing prediction control unit 118 compares the weather data and the aircraft data to historic de-icing data stored within the historic de-icing datastore 116. For example, the de-icing prediction control unit 118 analyzes the historic de-icing data to find a match of the weather data and aircraft data for a previous de-icing operation, a similar de-icing operation for a same or similar type aircraft within a predetermined similarity weather condition metric (such as within a certain threshold percentage of temperature, wind speed, and precipitation), and/or an average of similar past de-icing operations. At 406, the de-icing prediction control unit 118 predicts a de-icing time for the aircraft 102 based on the comparison. In at least one embodiment, the de-icing prediction control unit 118 forms a schedule for de-icing a plurality of aircraft at the airport 106 based on predicted de-icing times for the plurality of aircraft.

Figure 4B:
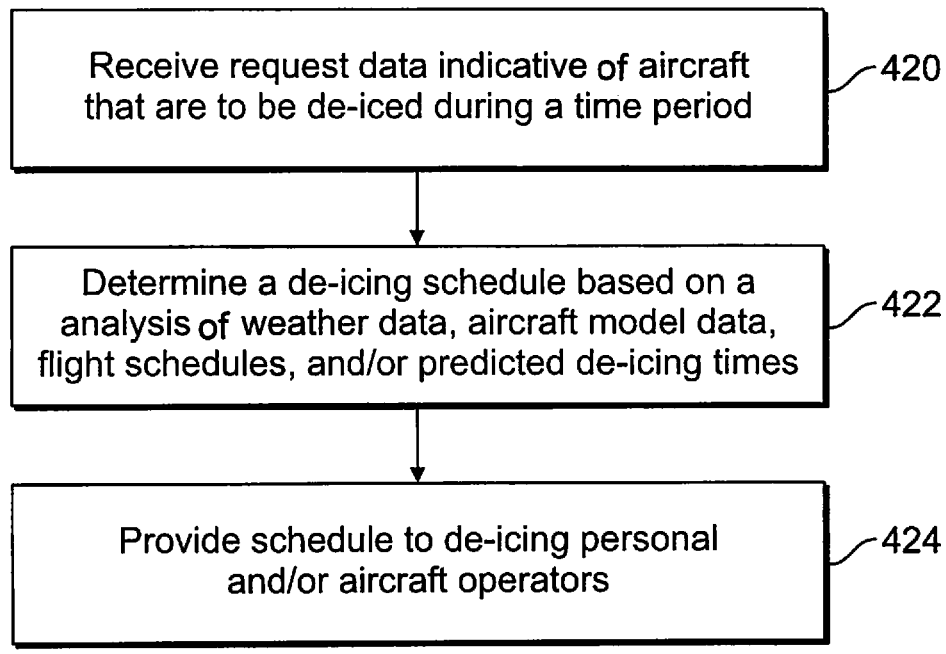
FIG. 4B illustrates a flow chart of a method of scheduling a de-icing operation for an aircraft, according to an embodiment of the present disclosure.

FIG. 4B illustrates a flow chart of a method of scheduling a de-icing operation for an aircraft, according to an embodiment of the present disclosure. At 420, at least one control unit receives request data indicative of aircraft that are to be de-iced during a time period, such as a day, 12 hours, 6 hours, 2 hours, or the like. At 422, the at least one control unit determines a de-icing schedule for the aircraft based on analysis of one or more of weather data, aircraft model data, flight schedules, predicted de-icing times, and/or the like. At 424, the at least one control unit provides a schedule for de-icing to de-icing personnel and/or operators of the aircraft.

Figure 5:
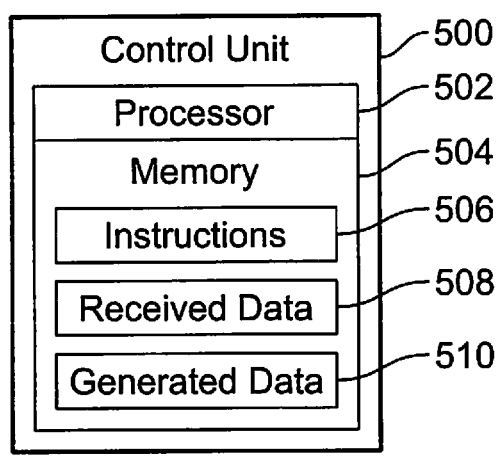
FIG. 5 illustrates a schematic block diagram of a control unit, according to an embodiment of the subject disclosure.

FIG. 5 illustrates a schematic block diagram of a control unit 500, according to an embodiment of the subject disclosure. In at least one embodiment, the de-icing time analysis control unit 108 and the de-icing prediction control unit 118 are configured as shown in FIG. 5. In at least one embodiment, the control unit 500 includes at least one processor 502 in communication with a memory 504. The memory 504 stores instructions 506, received data 508, and generated data 510. The control unit 500 shown in FIG. 5 is merely exemplary, and non-limiting.

As used herein, the term "control unit," "central processing unit," "unit," "CPU," "computer," or the like can include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the de-icing time analysis control unit 108 and the de-icing prediction control unit 118 can be or include one or more processors that are configured to control operation thereof, as described herein.

The control unit(s), such as the de-icing time analysis control unit 108 and the de-icing prediction control unit 118, are configured to execute a set of instructions that are stored in one or more data storage units or elements (such as one or more memories), in order to process data. For example, the de-icing time analysis control unit 108 and the de-icing prediction control unit 118 can include or be coupled to one or more memories. The data storage units can also store data or other information as desired or needed. The data storage units can be in the form of an information source or a physical memory element within a processing machine. The one or more data storage units or elements can comprise volatile memory or nonvolatile memory, or can include both volatile and nonvolatile memory. As an example, the non-volatile memory can comprise read only memory (ROM), programmable ROM (PROM), electrically programmable ROM (EPROM), electrically erasable PROM (EEPROM), and/or flash memory and volatile memory can include random access memory (RAM), which can act as external cache memory. The data stores of the disclosed systems and methods is intended to comprise, without being limited to, these and any other suitable types of memory The set of instructions can include various commands that instruct the control unit(s), such as the de-icing time analysis control unit 108 and the de-icing prediction control unit 118, as a processing machine to perform specific operations such as the methods and processes of the various embodiments of the subject matter described herein. The set of instructions can be in the form of a software program. The software can be in various forms such as system software or application software. Further, the software can be in the form of a collection of separate programs, a program subset within a larger program or a portion of a program. The software can also include modular programming in the form of object-oriented programming. The processing of input data by the processing machine can be in response to user commands, or in response to results of previous processing, or in response to a request made by another processing machine.

The diagrams of embodiments herein can illustrate one or more control or processing units, such as the de-icing time analysis control unit 108 and the de-icing prediction control unit 118. It is to be understood that the processing or control units can represent circuits, circuitry, or portions thereof that can be implemented as hardware with associated instructions (e.g., software stored on a tangible and non-transitory computer readable storage medium, such as a computer hard drive, ROM, RAM, or the like) that perform the operations described herein. The hardware can include state machine circuitry hardwired to perform the functions described herein. Optionally, the hardware can include electronic circuits that include and/or are connected to one or more logic-based devices, such as microprocessors, processors, controllers, or the like. Optionally, the control unit(s), such as the de-icing time analysis control unit 108 and the de-icing prediction control unit 118, can represent processing circuitry such as one or more of a field programmable gate array (FPGA), application specific integrated circuit (ASIC), microprocessor(s), and/or the like. The circuits in various embodiments can be configured to execute one or more algorithms to perform functions described herein. The one or more algorithms can include aspects of embodiments disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 6:
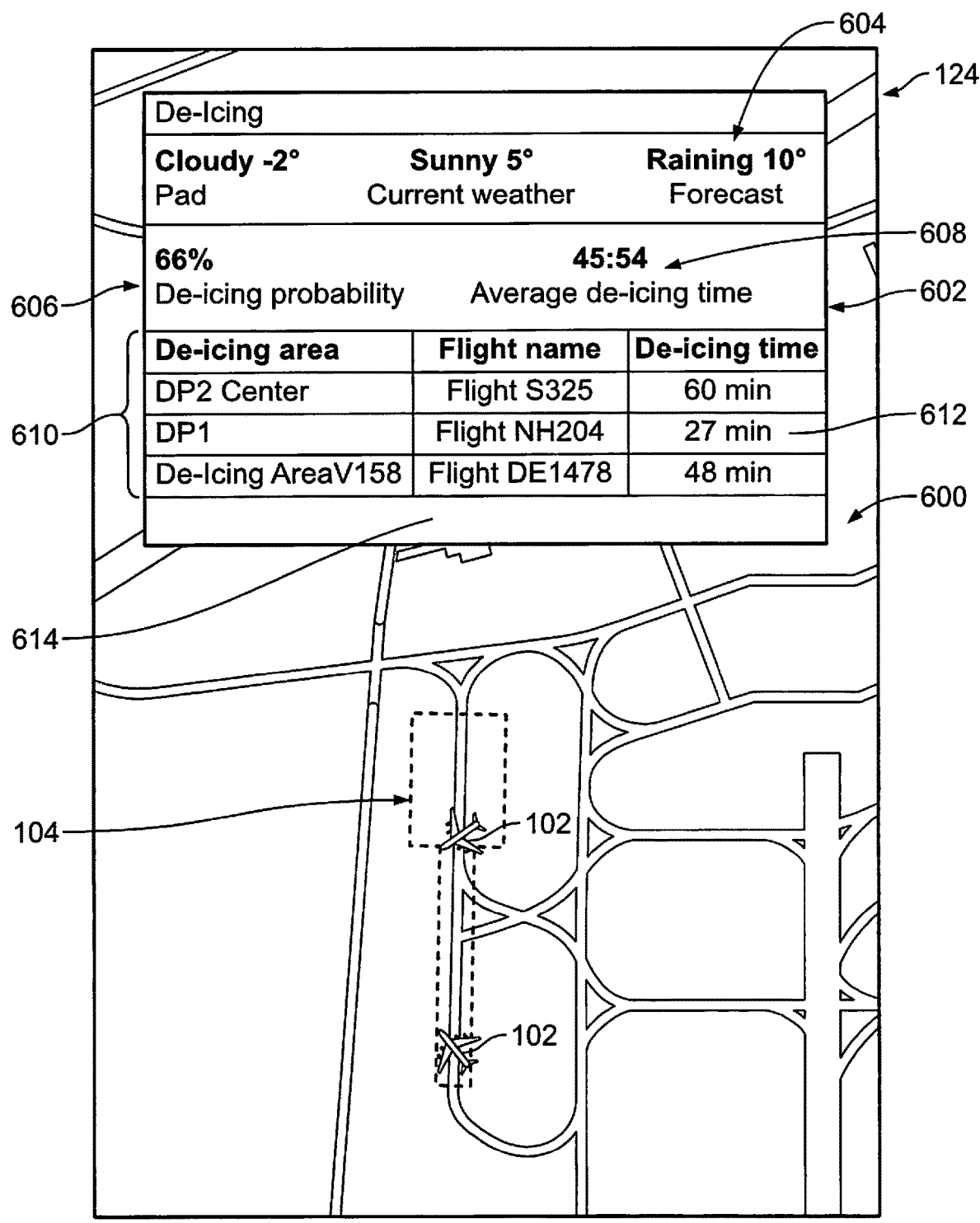
FIG. 6 illustrates a front view of a display showing a representation of a de-icing area on an airport map, according to an embodiment of the subject disclosure.

FIG. 6 illustrates a front view of the display 124 showing a representation of the de-icing are 104 on an airport map 600, according to an embodiment of the subject disclosure. Representations of aircraft 102 are also shown in the airport map 600. The display 124 also shows a de-icing information area 602 that includes current weather conditions 604, a de-icing probability 606, average de-icing time 608, and a de-icing schedule 610 (which can include de-icing operations that have already occurred, as shown in FIG. 6), including de-icing times 612 for particular flights 614.

Referring to FIGS. 1 and 6, one or more control units, such as the de-icing time analysis control unit 108 and/or the de-icing prediction control unit 118, are configured to determine a de-icing probability. For example, the control unit(s) can analyze current weather conditions in relation to historic de-icing data stored in the historic de-icing datastore 116 to determine one or more weather thresholds (such as a temperature threshold, precipitation threshold, a wind speed threshold, and/or the like) at which de-icing operations were conducted in the past. In at least one embodiment, the control unit(s) analyze the historic de-icing data to determine prior demand for de-icing operations during weather conditions that are the same as or similar to current weather conditions. In this manner, the control unit(s) are able to predict future demand for de-icing operations during current and future weather conditions.

Referring to FIGS. 1-6, embodiments of the subject disclosure provide systems and methods that allow large amounts of data to be quickly and efficiently analyzed by a computing device. For example, numerous aircraft can be de-iced at an airport. Each of the aircraft is tracked. Further, the weather conditions are monitored. As such, large amounts of data are being tracked and analyzed. The vast amounts of data are efficiently organized and/or analyzed by the control unit(s), as described above. The control unit(s) analyze the data in a relatively short time in order to quickly and efficiently detect de-icing times, predict future de-icing times, schedule de-icing operations, and predict demand for de-icing operations. A human being would be incapable of efficiently analyzing such vast amounts of data in such a short time. As such, embodiments of the subject disclosure provide increased and efficient functionality, and vastly superior performance in relation to a human being analyzing the vast amounts of data.

In at least one embodiment, components of the de-icing determination system 100, such as the de-icing time analysis control unit 108 and the de-icing prediction control unit 118, provide and/or enable a computer system to operate as a special computer system for analyzing de-icing operations.

Figure 7:
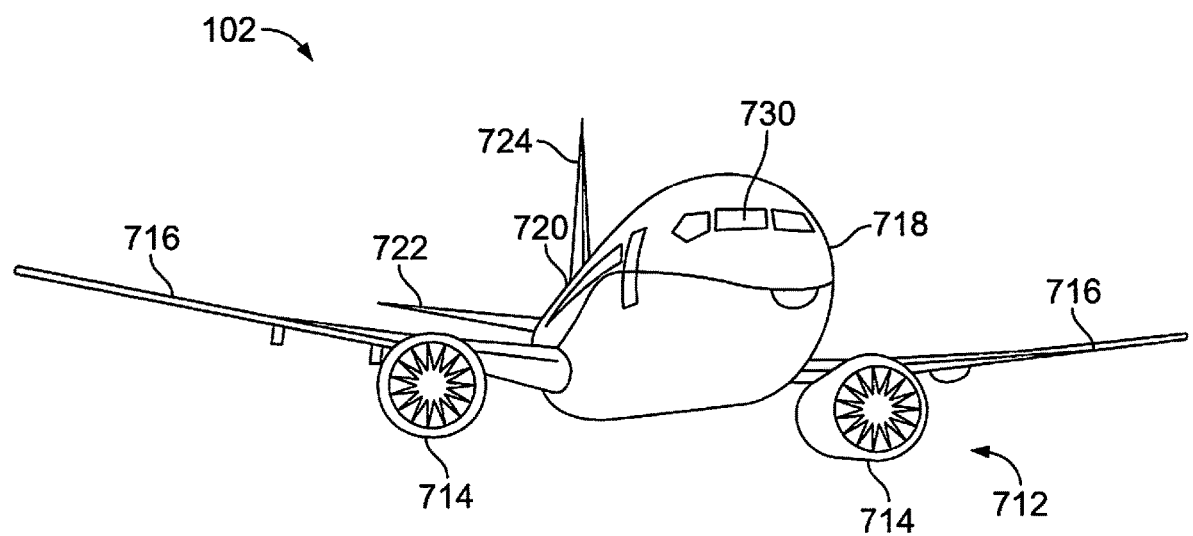
FIG. 7 illustrates a front perspective view of an aircraft, according to an exemplary embodiment of the subject disclosure.

FIG. 7 illustrates a front perspective view of the aircraft 102, according to an exemplary embodiment of the subject disclosure. The aircraft 102 includes a propulsion system 712 that can include two engines 714, for example. Optionally, the propulsion system 712 can include more engines 714 than shown. The engines 714 are carried by wings 716 of the aircraft 102. In other embodiments, the engines 714 can be carried by a fuselage 718 and/or an empennage 720. The empennage 720 can also support horizontal stabilizers 722 and a vertical stabilizer 724. The fuselage 718 of the aircraft 102 defines an internal cabin, which can include a cockpit 730, one or more work sections (for example, galleys, personnel carry-on baggage areas, and the like), and/or one or more passenger sections.

Further, the disclosure comprises embodiments according to the following clauses:

Clause 1. A system comprising:
at least one control unit that determines a de-icing time for an aircraft within a de-icing area of an airport.

Clause 2. The system of Clause 1, wherein the at least one control unit comprises a de-icing time analysis control unit.

Clause 3. The system of Clauses 1 or 2, further comprising a tracking sub-system in communication with the at least one control unit, wherein the tracking sub-system tracks a position of the aircraft at the airport, and wherein the at least one control unit determines the de-icing time for the aircraft based on the position of the aircraft in relation to the de-icing area.

Clause 4. The system of any of Clauses 1-3, wherein the tracking sub-system is an automatic dependent surveillance-broadcast (ADS-B) tracking sub-system.

Clause 5. The system any of Clauses 1-4, further comprising an airport mapping sub-system in communication with the at least one control unit, wherein the at least one control unit receives airport map data including a location of the de-icing area from the airport mapping sub-system.

Clause 6. The system of any of Clauses 1-5, wherein the at least one control unit determines the de-icing time by comparing an entry time of the aircraft into the de-icing location and an exit time of the aircraft from the de-icing location.

Clause 7. The system of any of Clauses 1-6, further comprising a weather determination sub-system in communication with the at least one control unit, wherein the weather determination sub-system provides weather data indicative of current weather conditions in relation to the airport, and wherein the at least one control unit associates weather conditions with the de-icing time.

Clause 8. The system of any of Clauses 1-7, further comprising a historic de-icing datastore in communication with the at least one control unit, wherein the at least one control unit stores de-icing data including the de-icing time for the aircraft within the at historic de-icing datastore.

Clause 9. The system of any of Clauses 1-8, wherein the de-icing data further comprises weather data including weather conditions during the de-icing time.

Clause 10. The system of any of Clauses 1-9, wherein the de-icing data further comprises aircraft data including aircraft type of the aircraft.

Clause 11. The system of any of Clauses 1-10, wherein the at least one control unit further predicts a de-icing time for at least one other aircraft within the de-icing area of the airport.

Clause 12. The system of any of Clauses 1-11, wherein the at least one control unit comprises a de-icing prediction control unit.

Clause 13. The system of any of Clauses 1-12, further comprising a historic de-icing datastore in communication with the at least one control unit, wherein the historic de-icing datastore stores historic de-icing data comprising de-icing times for a plurality of aircraft over a predetermined time period, and wherein the at least one control unit predicts the de-icing time for the at least one other aircraft based on the historic de-icing data.

Clause 14. The system of any of Clauses 1-13, wherein the historic de-icing data further comprises weather data including weather conditions during the de-icing times.

Clause 15. The system of any of Clauses 1-14, wherein the historic de-icing data further comprises aircraft data including aircraft type of the plurality of aircraft.

Clause 16. The system of any of Clauses 1-15, wherein the at least one control unit schedules de-icing times based on the predicted de-icing times for the at least one other aircraft.

Clause 17. The system of any of Clauses 1-16, wherein the at least one control unit further predicts demand for future de-icing operations based on historic de-icing data.

Clause 18. A method comprising:
determining, by at least one control unit, a de-icing time for an aircraft within a de-icing area of an airport.

Clause 19. The method of Clause 18, further comprising:
tracking, by a tracking sub-system in communication with the at least one control unit, a position of the aircraft at the airport; and
determining, by the at least one control unit, the de-icing time for the aircraft based on the position of the aircraft in relation to the de-icing area.

Clause 20. The method of claim 18 or 19, further comprising receiving, by the at least one control unit from an airport mapping sub-system in communication with the at least one control unit, airport map data including a location of the de-icing area from the airport mapping sub-system.

Clause 21. The method of any of Clauses 18-20, wherein said determining comprises comparing an entry time of the aircraft into the de-icing location and an exit time of the aircraft from the de-icing location.

Clause 22. The method of any of Clauses 18-21, further comprising:
receiving, by the at least one control unit from a weather determination sub-system in communication with the at least one control unit, weather data indicative of current weather conditions in relation to the airport; and
associating, by the at least one control unit, weather conditions with the de-icing time.

Clause 23. The method of any of Clauses 18-22, further comprising storing, within a historic de-icing datastore in communication with the at least one control unit, de-icing data including the de-icing time for the aircraft.

Clause 24. The method of any of Clauses 18-23, wherein the de-icing data further comprises weather data including weather conditions during the de-icing time, and aircraft data including aircraft type of the aircraft.

Clause 25. The method of any of Clauses 18-24, further comprising predicting, by the at least one control unit, a de-icing time for at least one other aircraft within the de-icing area of the airport.

Clause 26. The method of any of Clauses 18-25, further comprising:
storing, within a historic de-icing datastore in communication with the at least one control unit, historic de-icing data comprising de-icing times for a plurality of aircraft over a predetermined time period,
wherein said predicting comprises predicting the de-icing time for the at least one other aircraft based on the historic de-icing data.

Clause 27. The method of any of Clauses 18-26, wherein the historic de-icing data further comprises weather data including weather conditions during the de-icing times, and aircraft data including aircraft type of the plurality of aircraft.

Clause 28. The method of any of Clauses 18-27, further comprising scheduling, by the at least one control unit, de-icing times based on the predicted de-icing times for the at least one other aircraft.

Clause 29. The method of any of Clauses 18-28, further comprising predicting, by the at least one control unit, demand for future de-icing operations based on historic de-icing data.

Clause 30. A system comprising:
at least one control unit that predicts a de-icing time for an aircraft within a de-icing area of an airport.

Clause 31. A method comprising:
predicting, by at least one control unit, a de-icing time for an aircraft within a de-icing area of an airport.

Clause 32. A system comprising:
at least one control unit that schedules de-icing times for a plurality of aircraft within a de-icing area of an airport.

Clause 33. A method comprising:
scheduling, by at least one control unit, de-icing times for a plurality of aircraft within a de-icing area of an airport.

Clause 34. A system comprising:
at least one control unit that predicts demand for future de-icing operations of aircraft within a de-icing area of an airport.

Clause 35. A method comprising:
predicting, by at least one control unit, demand for future de-icing operations of aircraft within a de-icing area of an airport.

Clause 36. A system comprising:
at least one first control unit that determines, based on tracked aircraft position data, a de-icing time for a first aircraft within a de-icing area of an airport; and
at least one second control unit that determines, based on the de-icing time, a schedule for de-icing one or both of the first aircraft and a second aircraft.

Clause 37. A method comprising:
determining, by at least one first control unit, a de-icing time for a first aircraft within a de-icing area of an airport based on tracked aircraft position data; and
determining, by at least one second control unit, a schedule for de-icing one or both of the first aircraft or a second aircraft based on the de-icing time.

Clause 38. A non-transitory computer-readable storage medium comprising executable instructions that, in response to execution, cause one or more control units comprising a processor, to perform operations as described herein.

As described herein, embodiments of the subject disclosure provide system and methods for accurately and effectively determining de-icing operations for aircraft. Further, embodiments of the subject disclosure provide systems and methods for effectively scheduling de-icing operations at an airport.

While various spatial and directional terms, such as top, bottom, lower, mid, lateral, horizontal, vertical, front and the like can be used to describe embodiments of the subject disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:
1. A system comprising:
a historic de-icing datastore configured to store de-icing data including de-icing times for a plurality of aircraft over a predetermined time period, historical weather data including historical weather conditions during the de-icing times, and historical aircraft data comprising a type and size of the plurality of aircraft;
at least one hardware processor;
at least one first control unit executed by the at least one hardware processor to:
(a) determine, based on tracked aircraft position data, a de-icing time for a first aircraft within a de-icing area of an airport, wherein a real time position, altitude, heading, acceleration, and velocity of the first aircraft are detected by an automatic dependent surveillance-broadcast (ADS-B) tracking sub-system and a global positioning sensor of the first aircraft,
(b) receive from a doppler radar of a weather determination sub-system, current weather data indicative of current weather conditions including current tem- perature, wind speed and direction of precipitation, at an airport and in proximity of the airport, (c) correlate the current weather conditions with a current time of the de-icing;

an airport mapping sub-system in communication with the at least one first control unit, wherein the at least one first control unit is executed by the at least one hardware processor to receive airport map data including a location of the de-icing area from the airport mapping sub-system, wherein the de-icing area is locatable through global positioning system data;

at least one second control unit executed by the at least one hardware processor to initiate a schedule for de-icing the first aircraft based on a determination that the first aircraft is scheduled to takeoff from the airport, wherein the at least one second control unit is configured to correlate the position of the first aircraft scheduled to takeoff with the airport map data; and a user interface including a display and an input device, wherein the user interface is communicatively coupled with the at least one first control unit and the at least one second control unit;

wherein the at least one first control unit is further configured to determine a de-icing time for the first aircraft heading to the de-icing area of the airport based on the detected position of the first aircraft and a matching of the first aircraft to the historical aircraft data corresponding to a same or similar aircraft within threshold weather percentage of temperature, wind speed, and precipitation among the historical weather data;

wherein the at least one first control unit is further configured to determine delay by tracking historical de-icing data with the de-icing time for the first aircraft currently within the de-icing area;

wherein the at least one second control unit is further configured to determine a schedule for de-icing one or both of the first aircraft or a second aircraft based on the de-icing time;

wherein the first control unit is further configured to output a first signal including de-icing data regarding the de-icing times, types and sizes of the first aircraft and the second aircraft to the user interface;

wherein the user interface is configured to show the de-icing times, types and sizes of the first and second aircrafts on the display;

wherein the at least one second control unit is further configured to output a second signal including the schedule for de-icing the first and second aircrafts data to the user interface.

2. The system of claim 1, further comprising the ADS-B tracking sub-system in communication with the at least one first control unit, wherein the ADS-B tracking sub-system is executed by the at least one hardware processor to track the position of the first aircraft at the airport, and wherein the at least one first control unit is executed by the at least one hardware processor to determine the de-icing time for the first aircraft based on the position of the aircraft in relation to the de-icing area.

3. The system of claim 1, wherein the at least one first control unit is executed by the at least one hardware processor to determine the de-icing time by comparing an entry time of the first aircraft into the de-icing location and an exit time of the first aircraft from the de-icing location.

4. The system of claim 1, further comprising the weather determination sub-system in communication with the at least one first control unit, wherein the weather determination sub-system is executed by the at least one hardware processor to provide the current weather data.

5. The system of claim 1, wherein the at least one first control unit is executed by the at least one hardware processor to store the historical de-icing data within the historic de-icing datastore.

6. The system of claim 1, wherein the at least one first control unit is executed by the at least one hardware processor to further predict a de-icing time for at least one other aircraft within the de-icing area of the airport.

7. The system of claim 6, wherein the at least one first control unit comprises a de-icing prediction control unit.

8. The system of claim 6, wherein the at least one first control unit is executed by the at least one hardware processor to predict the de-icing time for the at least one other aircraft based on the historical de-icing data.

9. The system of claim 1, wherein the at least one first control unit is executed by the at least one hardware processor to further predict demand for future de-icing operations based on the de-icing data.

10. A method comprising:

storing, in a historic de-icing datastore, historical de-icing data comprising: de-icing times for a plurality of aircraft over a predetermined time period, historical weather data including historical weather conditions during the de-icing times, and historical aircraft data comprising a type and size of the plurality of aircraft;

receiving, from a doppler radar of a weather determination sub-system, current weather data indicative of current weather conditions including current temperature, wind speed and direction of precipitation, at an airport and in proximity of the airport;

correlating, the current weather conditions with a current time of the de-icing;

detecting by an automatic dependent surveillance-broadcast (ADS-B) tracking sub-system and a global positioning sensor of the first aircraft, a real-time position, altitude, heading, acceleration, and velocity of the first aircraft;

receiving, from an airport mapping sub-system, airport map data including a location of a de-icing area from the airport mapping sub-system;

initiating a scheduling for the de-icing of the first aircraft based on a determination that the first aircraft is scheduled to takeoff from the airport;

correlating the position of the first aircraft scheduled to takeoff with the airport map data;

locating the de-icing area within the airport through global position system data;

determining, by at least one first control unit, a de-icing time for the first aircraft heading to the de-icing area of the airport based on the detected position of the first aircraft and a matching of the first aircraft to the historical aircraft data corresponding to a same or similar aircraft within threshold weather percentage of temperature, wind speed, and precipitation among the historical weather data;

determining delays by tracking the historical de-icing data with the de-icing time for the first aircraft currently within the de-icing area;

determining, by at least one second control unit, a schedule for de-icing the first aircraft and a second aircraft based on the de-icing time;

communicatively coupling a user interface including a display and an input device with the at least one first control unit and the at least one second control unit;

outputting, by the first control unit, a first signal including respective de-icing times, types and sizes of the first and second aircrafts to the user interface;

showing, by the user interface, the respective de-icing times, types and sizes of the first and second aircrafts on the display;

outputting, by the at least one second control unit, a second signal including the schedule for de-icing the first and the second aircraft to the user interface; and showing, by the user interface, the schedule on the display.

11. The method of claim 10, wherein said determining the de-icing time comprises comparing an entry time of the first aircraft into the de-icing location and an exit time of the first aircraft from the de-icing location.

12. The method of claim 10, further comprising:
receiving, by the at least one first control unit from the weather determination sub-system in communication with the at least one first control unit, the current weather data; and
associating, by the at least one first control unit, the weather conditions with the de-icing time.

13. The method of claim 10, further comprising predicting, by the at least one first control unit, a de-icing time for at least one other aircraft within the de-icing area of the airport.

14. The method of claim 13, further comprising:
storing, within a historic de-icing datastore in communication with the at least one first or second control unit, the historical de-icing data comprising the de-icing times for the plurality of aircraft over the predetermined time period,
wherein said predicting comprises predicting the de-icing time for the at least one other aircraft based on the historic de-icing data.

15. The method of claim 14, wherein the historical de-icing data further comprises the historical weather data including weather conditions during the de-icing times, and the historical aircraft data.

16. The method of claim 10, further comprising predicting, by the at least one first or second control unit, demand for future de-icing operations based on the historical de-icing data.

17. The system of claim 1, wherein the at least one second control unit is executed by the at least one hardware processor to determine, based on the de-icing time of the first aircraft, the schedule for de-icing both of the first aircraft and the second aircraft.

18. A non-transitory computer-readable storage medium comprising executable instructions that, in response to execution, cause one or more control units comprising a processor, to perform operations comprising:
storing, in a historic de-icing datastore, historical de-icing data comprising: de-icing times for a plurality of aircraft over a predetermined time period, historical weather data including historical weather conditions during the de-icing times, and historical aircraft data comprising a type and size of the plurality of aircraft;
receiving, from a doppler radar of a weather determination sub-system, current weather data indicative of current weather conditions including current temperature, wind speed and direction of precipitation, at an airport and in proximity of the airport;
correlating, the current weather conditions with a current time of the de-icing;
detecting by an automatic dependent surveillance-broadcast (ADS-B) tracking sub-system and a global positioning sensor of the first aircraft, a real-time position, altitude, heading, acceleration, and velocity of the first aircraft;
receiving, from an airport mapping sub-system, airport map data including a location of a de-icing area from the airport mapping sub-system;
initiating a scheduling for the de-icing of the first aircraft based on a determination that the first aircraft is scheduled to takeoff from the airport;
correlating the position of the first aircraft scheduled to takeoff with the airport map data;
locating the de-icing area within the airport through global position system data;
determining, by at least one first control unit, a de-icing time for the first aircraft heading to the de-icing area of the airport based on the detected position of the first aircraft and a matching of the first aircraft to the historical aircraft data corresponding to a same or similar aircraft within threshold weather percentage of temperature, wind speed, and precipitation among the historical weather data;
determining delays by tracking the historical de-icing data with the de-icing time for the first aircraft currently within the de-icing area;
determining, by at least one second control unit, a schedule for de-icing the first aircraft and a second aircraft based on the de-icing time;
communicatively coupling a user interface including a display and an input device with the at least one first control unit and the at least one second control unit;
outputting, by the first control unit, a first signal including respective de-icing times, types and sizes of the first and second aircrafts to the user interface;
showing, by the user interface, the respective de-icing times, types and sizes of the first and second aircrafts on the display;
outputting, by the at least one second control unit, a second signal including the schedule for de-icing the first and second aircrafts to the user interface; and
showing, by the user interface, the schedule on the display.

19. The non-transitory computer-readable storage medium of claim 18, wherein said determining the de-icing time comprises comparing an entry time of the first aircraft into the de-icing location and an exit time of the first aircraft from the de-icing location.

20. The non-transitory computer-readable storage medium of claim 18, further comprising;
receiving, by the at least one first control unit from the weather determination sub-system in communication with the at least one first control unit, the current weather data; and
associating, by the at least one first control unit, the weather conditions with the de-icing time.

21. The non-transitory computer-readable storage medium of claim 18, further comprising predicting, by the at least one first control unit, a de-icing time for at least one other aircraft within the de-icing area of the airport.

* * * * *